US012243495B2

(12) United States Patent
Lee et al.

(10) Patent No.: US 12,243,495 B2
(45) Date of Patent: Mar. 4, 2025

(54) PIXEL CIRCUIT AND DISPLAY DEVICE INCLUDING THE SAME

(71) Applicant: LG Display Co., Ltd., Seoul (KR)

(72) Inventors: Hyun Soo Lee, Paju-si (KR); Sung Ho Hong, Paju-si (KR); Seo Jun Yeom, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/487,542

(22) Filed: Oct. 16, 2023

(65) Prior Publication Data

US 2024/0212631 A1 Jun. 27, 2024

(30) Foreign Application Priority Data

Dec. 23, 2022 (KR) ........................ 10-2022-0183145

(51) Int. Cl.
*G09G 3/3291* (2016.01)
*G09G 3/3266* (2016.01)
*G09G 3/3258* (2016.01)

(52) U.S. Cl.
CPC ......... *G09G 3/3291* (2013.01); *G09G 3/3266* (2013.01); *G09G 3/3258* (2013.01); *G09G 2310/027* (2013.01)

(58) Field of Classification Search
CPC .. G09G 3/3291; G09G 3/3266; G09G 3/3258; G09G 2310/027
See application file for complete search history.

(56) References Cited

U.S. PATENT DOCUMENTS

| | | | | |
|---|---|---|---|---|
| 9,779,666 | B2 | 10/2017 | Kwon et al. | |
| 11,568,811 | B2 | 1/2023 | Kim et al. | |
| 11,653,538 | B2 | 5/2023 | Kim et al. | |
| 2015/0130780 | A1 | 5/2015 | Kwon et al. | |
| 2015/0130785 | A1* | 5/2015 | Shin | G09G 5/18 345/82 |
| 2016/0240142 | A1* | 8/2016 | Jeong | G09G 3/3233 |
| 2020/0410931 | A1* | 12/2020 | Li | G09G 3/3233 |
| 2021/0202673 | A1 | 7/2021 | Kim et al. | |
| 2021/0398489 | A1 | 12/2021 | Kim et al. | |

FOREIGN PATENT DOCUMENTS

| | | | |
|---|---|---|---|
| KR | 10-2109191 | B1 | 5/2020 |
| KR | 10-2021-0085513 | A | 7/2021 |
| KR | 10-2021-0157642 | A | 12/2021 |

* cited by examiner

*Primary Examiner* — Premal R Patel
(74) *Attorney, Agent, or Firm* — Fenwick & West LLP

(57) ABSTRACT

A pixel circuit and a display device including the same are disclosed. The pixel circuit includes a driving element including a first electrode connected to a first power line, a gate electrode connected to a first node, and a second electrode connected to a second node, a first switch element connected between a data line through which a first or second data voltage is applied and the first node, and supplies the first data voltage to the first node responsive to a first gate signal, a second switch element connected between the data line and the second node and supplies the second data voltage to the second node responsive to a second gate signal, a light-emitting element including an anode connected to the second node and a cathode connected to a second power line, and a capacitor connected between the first and second nodes.

14 Claims, 13 Drawing Sheets

PIXEL CIRCUIT AND DISPLAY DEVICE INCLUDING THE SAME

CROSS-REFERENCE TO RELATED APPLICATION

This application claims the benefit of Republic of Korea Patent Application No. 10-2022-0183145, filed in the Republic of Korea on Dec. 23, 2022, which is hereby incorporated by reference in its entirety.

BACKGROUND

Technical Field

The present disclosure relates to a device, and particularly to, for example, without limitation, a pixel circuit and a display device including the same.

Discussion of the Related Art

Display devices includes a liquid crystal display (LCD) device, an electroluminescence display device, a field emission display (FED) device, a plasma display panel (PDP), electrophoretic display device and the like.

Electroluminescent display devices are divided into inorganic light emitting display devices and organic light emitting display devices according to a material of a light emitting layer. Organic light emitting display devices may be categorized into a passive matrix type and an active-matrix type depending on a driving method. An active-matrix type organic light emitting display device reproduces an input image using a self-emissive element which emits light by itself, for example, an organic light emitting diode (hereinafter referred to as an "OLED"). An organic light emitting display device has advantages such as a fast response speed and high luminous efficiency, luminance, a large viewing angle, and is capable of expressing black gradation in perfect black, thereby achieving a high contrast ratio and a high color reproduction rate.

Some of display devices, for example, a liquid crystal display device or an organic light emitting display device includes a display panel including a plurality of sub-pixels, a driver outputting a driving signal for driving the display panel, a power supply generating power to be supplied to the display panel or the driver, and the like. The driver includes a gate driver that supplies a scan signal or a gate signal to the display panel, and a data driver that supplies a data signal to the display panel, and the like.

Each of a plurality of pixels includes a driving element that controls a driving current, which flows to an organic light-emitting diode (OLED), according to a voltage Vgs applied between a gate electrode and a source electrode. The driving element should have uniform electrical characteristics such as a threshold voltage Vth and/or a mobility μ between all the pixels, but there may be differences in electrical characteristics between the pixels due to a process variation and an element characteristic variation, and electrical characteristics of the driving element may deteriorate with the lapse of a driving time. Accordingly, an OLED display device compensates for the deterioration of the driving element through an internal compensation method or an external compensation method.

The internal compensation technique samples a threshold voltage of the driving element for each sub-pixel by using an internal compensation circuit implemented in each pixel circuit and compensates the gate-source voltage (Vgs) of the driving element by the threshold voltage so that a current flowing in the OLED is not affected by the threshold voltage of the driving element.

In this case, the internal compensation method is a method of applying a reference voltage to a source node of the driving element through a reference voltage line during an initialization period for an internal compensation operation of the driving element to initialize the driving element and then sensing a threshold voltage Vth of the driving element to perform the compensation. However, the internal compensation method necessarily requires a circuit configuration for applying the reference voltage and the reference voltage line, which imposes significant limitations on a high-resolution pixel layout design.

The description provided in the discussion of the related art section should not be assumed to be prior art merely because it is mentioned in or associated with that section. The discussion of the related art section may include information that describes one or more aspects of the subject technology, and the description in this section does not limit the current disclosure.

SUMMARY

Therefore, the inventors have recognized necessity and limitations described above and have conducted various experiments to solve them.

Accordingly, embodiments of the present disclosure are directed to a pixel circuit from which a reference voltage line is removed, and a display device including the same.

It should be noted that objects of the present disclosure are not limited to the above-described objects, and other objects of the present disclosure will be apparent to those skilled in the art from the following descriptions.

According to an aspect of the disclosure, a pixel circuit of the present disclosure may include a driving element including a first electrode connected to a first power line through which a pixel driving voltage is applied, a gate electrode connected to a first node, and a second electrode connected to a second node, a first switch element connected between a data line through which a first data voltage or a second data voltage is applied and the first node and configured to supply the first data voltage to the first node in response to a first gate signal, a second switch element that is connected between the data line and the second node and configured to supply the second data voltage to the second node in response to a second gate signal, a light-emitting element including an anode connected to the second node and a cathode connected to a second power line through which a low-potential power voltage is applied, and a capacitor connected between the first node and the second node.

According to an aspect of the disclosure, a display device of the present disclosure may include a display panel in which a plurality of data lines, a plurality of gate lines crossing the data lines, a plurality of power lines through which different constant voltages are applied, and a plurality of pixel circuits are disposed, a data driving unit configured to supply a first data voltage or a second data voltage to the data lines, and a gate driving unit configured to apply a first gate signal and a second gate signal to the gate lines, wherein each of the pixel circuits includes a driving element including a first electrode connected to a first power line through which a pixel driving voltage is applied, a gate electrode connected to a first node, and a second electrode connected to a second node, a first switch element connected between the data line through which the first data voltage or the second data voltage is applied and the first node and configured to supply the first data voltage to the first node in response to the first gate signal, a second switch element connected between the data line and the second node and configured to supply the second data voltage to the second node in response to the second gate signal, a light-emitting element including an anode connected to the second node and a cathode connected to a second power line through which a low-potential power voltage is applied, and a capacitor connected between the first node and the second node.

According to the present disclosure, in an initialization period, a black data voltage is applied to a source node of a driving element through a data voltage line instead of applying a reference voltage to the source node through a reference voltage line, so that the reference voltage line through which the reference voltage is applied can be removed and the source node of the driving element can be initialized through a data line.

According to the present disclosure, a high-resolution pixel layout design can be enabled by removing a reference voltage line.

The effects of the present disclosure are not limited to the above-mentioned effects, and other effects that are not mentioned will be apparently understood by those skilled in the art from the following description and the appended claims.

BRIEF DESCRIPTION OF THE DRAWINGS

The above and other objects, features, and advantages of the present disclosure will become more apparent to those of ordinary skill in the art by describing exemplary embodiments thereof in detail with reference to the accompanying drawings, in which.

DETAILED DESCRIPTION

Figure 1:
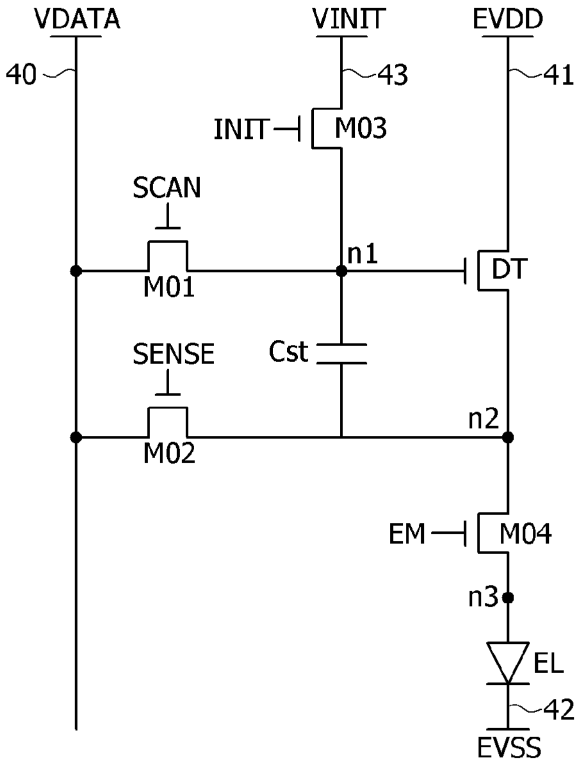
FIG. 1 is a diagram illustrating a pixel circuit according to a first exemplary embodiment of the present disclosure.

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. Names of the respective elements used in the following explanations may be selected only for convenience of writing the specification and may be thus different from those used in actual products.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification unless otherwise described. Further, in describing the present disclosure, detailed descriptions of known related technologies may be omitted to avoid unnecessarily obscuring the subject matter of the present disclosure.

The terms such as “containing”, “comprising,” “including,” “having,” and “comprising” used herein are generally intended to allow other components to be added unless the terms are used with the term “only.” Any references to singular may include plural unless expressly stated otherwise.

Components are interpreted to include an ordinary error range or tolerance range even if not expressly stated.

Any implementation described herein as an “example” is not necessarily to be construed as preferred or advantageous over other implementations.

When the position relation between two components is described using the terms such as “on,” “above,” “below,” and “next,” one or more components may be positioned between the two components unless the terms are used with the term “just” or “immediately” or “directly.”

The terms “first,” “second,”, “A,” “B,” “(a),” “(b),” and the like may be used to distinguish components from each other, but the functions or structures of the components are not limited by ordinal numbers or component names in front of the components.

The expression that an element is “connected,” “coupled,” or “adhered” to another element or layer, the element or layer can not only be directly connected or adhered to another element or layer, but also be indirectly connected or adhered to another element or layer with one or more intervening elements or layers “disposed,” or “interposed” between the elements or layers, unless otherwise specified.

The same reference numerals may refer to substantially the same elements throughout the present disclosure.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein. For example, the term "part" or "unit" may apply, for example, to a separate circuit or structure, an integrated circuit, a computational block of a circuit device, or any structure configured to perform a described function as should be understood to one of ordinary skill in the art.

The following embodiments can be partially or entirely bonded to or combined with each other and can be linked and operated in technically various ways. The exemplary embodiments can be carried out independently of or in association with each other.

Hereinafter, various exemplary embodiments of the present disclosure will be described in detail with reference to the accompanying drawings.

Figure 2:
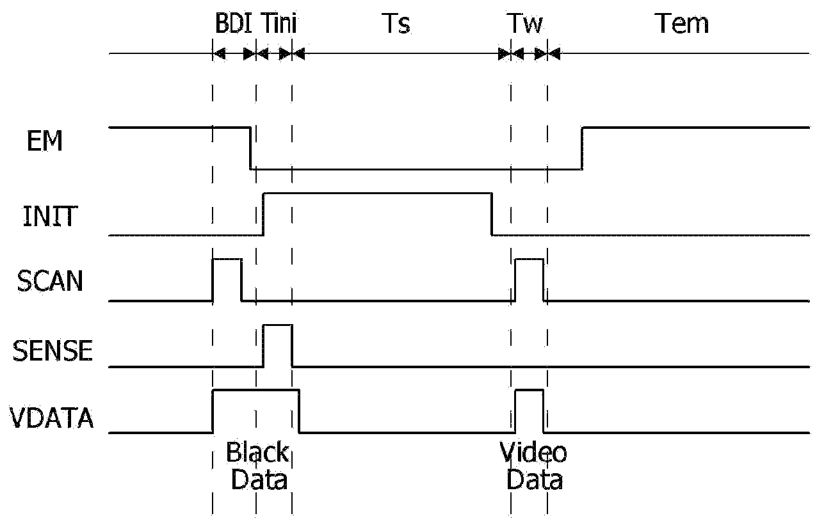
FIG. 2 is a diagram illustrating a driving timing of the pixel circuit shown FIG. 1, according to an embodiment of the present disclosure.

FIG. 1 is a diagram illustrating a pixel circuit according to a first exemplary embodiment of the present disclosure, and FIG. 2 is a diagram illustrating a driving timing of the pixel circuit shown FIG. 1, according to an embodiment of the present disclosure.

Referring to FIGS. 1 and 2, a pixel circuit according to a first exemplary embodiment of the present disclosure may include a light-emitting element EL, a driving element DT configured to supply a current to the light-emitting element EL, a plurality of switch elements M01, M02, M03, and M04 configured to turn on or turn off current paths connected to the driving element DT, and a first capacitor Cst configured to store a gate-source voltage of the driving element DT. The driving element DT and the switch elements M01, M02, M03, and M04 may be implemented as n-channel oxide thin-film transistors (TFTs), but is not limited thereto, and may alternatively be implemented as p-channel oxide TFTs. When p-channel oxide TFTs are implemented, voltage levels of respectively signals in FIG. 2 may also be changed accordingly.

The light-emitting element EL emits light by a current applied through a channel of the driving element DT according to a gate-source voltage Vgs of the driving element DT, which varies according to a data voltage VDATA and the like. The light-emitting element EL may be implemented as an organic light-emitting diode (OLED) including an organic compound layer formed between an anode and a cathode. The organic compound layer may include, but is not limited to, a hole injection layer HIL, a hole transport layer HTL, a light-emitting layer EML, an electron transport layer ETL, an electron injection layer EIL, and the like. The anode of the light-emitting element EL is connected to the driving element DT through a third node n3, and the cathode of the light-emitting element EL is connected to a second power line 42 through which a low-potential power voltage EVSS is applied.

The driving element DT supplies a current to the light-emitting element EL according to the gate-source voltage Vgs thereof to drive the light-emitting element EL. The driving element DT includes a gate connected to a first node n1, a first electrode (or a drain) connected to a first power line 41, and a second electrode (or source) connected to a second node n2.

A first switch element M01 is turned on according to a gate-on voltage of a scan signal SCAN and connects a data voltage line 40 to the first node n1 to apply the data voltage VDATA. The first switch element M01 includes a gate connected to a gate line through which the scan signal SCAN is applied, a first electrode connected to a data voltage line 40 through which a data voltage VDATA is applied, and a second electrode connected to the first node n1.

A second switch element M02 is turned on according to a gate-on voltage of a sensing signal SENSE and connects the data voltage line 40 to the second node n2 to apply a data voltage VDATA. The second switch element M02 includes a gate connected to a gate line through which the sensing signal SENSE is applied, a first electrode connected to the data voltage line 40 through which a data voltage VDATA is applied, and a second electrode connected to the second node n2.

As described later, in different operation periods, data voltage VDATA may have different voltage levels. For example, when the first switch element M01 is turned on, the data voltage VDATA applied to the first node n1 (hereinafter, referred to as "first data voltage VDATA1") may be a data voltage to which a compensation value for compensating for an electrical characteristic change of the driving element is reflected, and the second switch element M02 is turned on, the data voltage VDATA applied to the second node n2 (hereinafter, referred to as "second data voltage VDATA2") may be a data voltage for initializing the source node of the driving element without turning on the light-emitting element.

A third switch element M03 is turned on according to a gate-on voltage of an initialization signal INIT and connects an initialization voltage line 43 to the first node n1 to apply an initialization voltage VINIT. The third switch element M03 includes a gate to which the initialization signal INIT is applied, a first electrode connected to the initialization voltage line 43, and a second electrode connected to the first node n1.

A fourth switch element M04 is turned on according to a gate-on voltage of an EM signal EM and connects the second electrode of the driving element DT to the anode of the light-emitting element EL. The fourth switch element M04 includes a gate connected to a gate line through which the EM signal EM is applied, a first electrode connected to the second node n2, and a second electrode connected to the third node n3.

The first capacitor Cst is connected between the first node n1 and the second node n2. The first capacitor Cst charges the gate-source voltage Vgs of the driving element DT.

As shown in FIG. 2, the pixel circuit may be driven in the order of an initialization operation Tini, a sensing operation Ts, a data writing operation Tw, and a light-emitting operation Tem, after an operation BDI of applying the second data voltage of a predetermined grayscale. In the initialization operation Tini, the pixel circuit is initialized to have the second data voltage VDATA2. In the sensing operation Ts, a threshold voltage Vth of the driving element DT is sensed and stored in the first capacitor Cst. In the data writing operation Tw, a first data voltage VDATA1 of pixel data is applied to the first node n1. In the light-emitting operation Tem, the light-emitting element EL may emit light with a luminance corresponding to a grayscale value of the pixel data. However, the driving order of the pixel circuit may be not limited thereto, and may be modified as required.

FIGS. 3A to 3D are circuit diagrams illustrating an operation of the pixel circuit shown in FIG. 1 step by step, according to an embodiment of the present disclosure. Here, operations according to the driving timing as shown in FIG. 2 will be described.

Figure 3A:
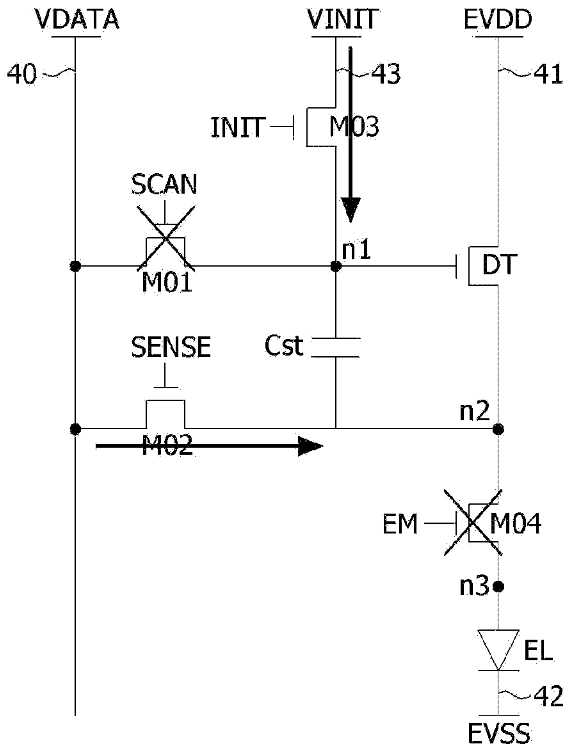
FIGS. 3A to 3D are circuit diagrams illustrating an operation of the pixel circuit shown in FIG. 1 step by step, according to an embodiment of the present disclosure.
Figure 3A:
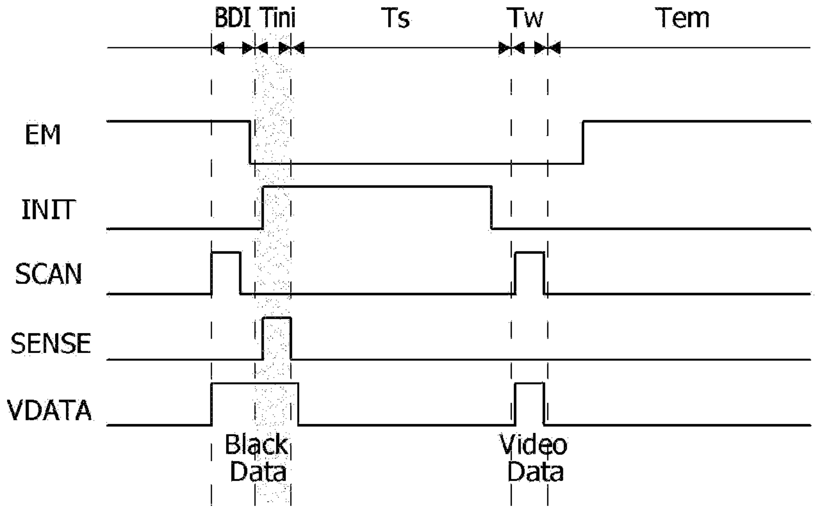

In the initialization operation Tini as shown in FIG. 3A, the second and third switch elements M02 and M03 are turned on, and the first and fourth switch elements M01 and M04 are turned off. The initialization voltage VINIT is applied to the first node n1, and a second data voltage VDATA2 is applied to the second node n2. In this case, the driving element DT is turned on, and the light-emitting element EL is not turned on.

Here, since the voltage Vg of the first node becomes VINIT and a voltage Vs of the second node becomes VDATA2, the gate-source voltage Vgs of the driving element becomes VINIT−VDATA2.

Here, the second data voltage VDATA2 may be a data voltage that does not turn on the light-emitting element EL. For example, the second data voltage VDATA2 may be a low-grayscale data voltage, for example, a black data voltage.

More specifically, since a voltage level of the black data voltage is set to be higher than a voltage level of an initialization voltage VINIT applied through an initialization voltage line, the gate-source voltage VINIT-VDATA of the driving element is maintained to be smaller than zero and in turn smaller than the threshold voltage Vth and thus does not turn on the light-emitting element.

Figure 3B:
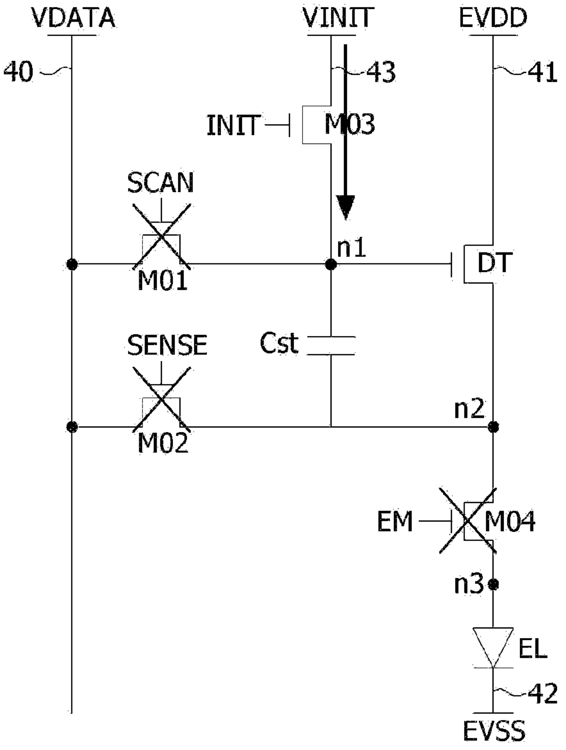
Figure 3B:
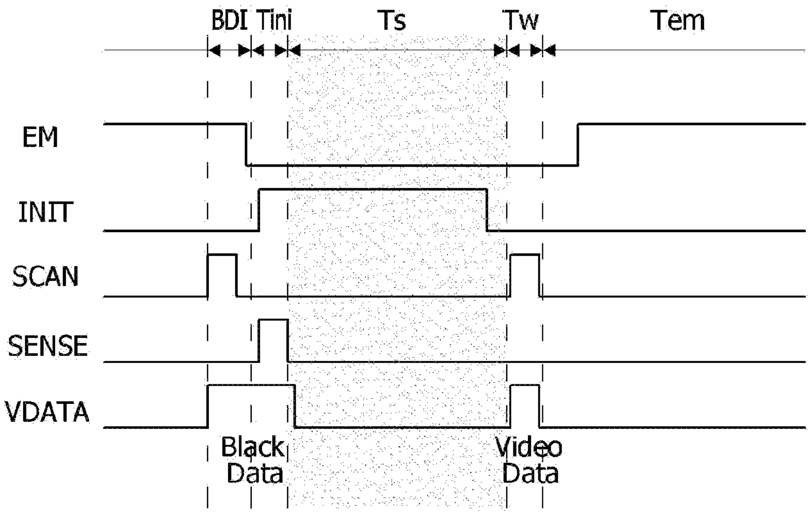

In the sensing operation Ts, as shown in FIG. 3B, the first, second, and fourth switch elements M01, M02, and M04 are turned off, and the third switch element M03 is maintained in the ON state to increase the voltage of the first node n1, so that when the gate-source voltage Vgs of the driving element DT reaches the threshold voltage Vth, the driving element DT is turned off and the threshold voltage Vth is stored in the capacitor Cst.

Here, since the voltage Vg of the first node becomes VINIT and the voltage Vs of the second node becomes VINIT−Vth, the gate-source voltage Vgs of the driving element becomes VINIT−(VINIT−Vth)=Vth.

Figure 3C:
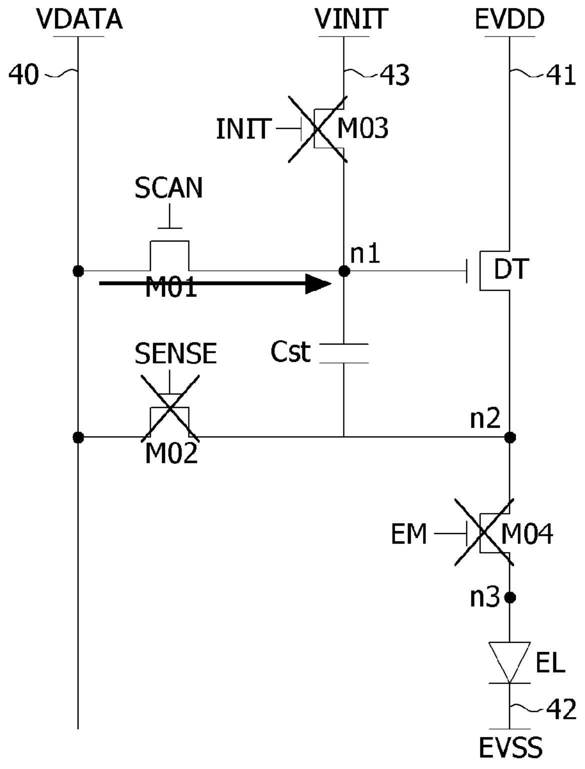
Figure 3C:
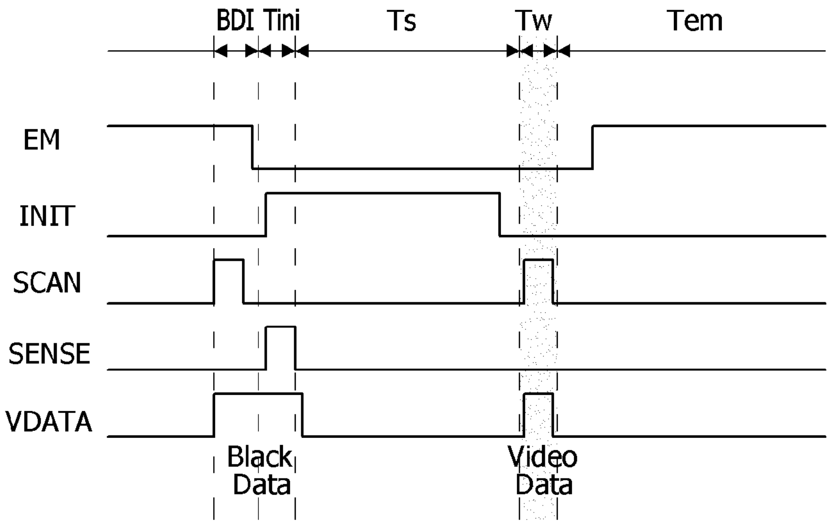

In the data writing operation Tw, as shown in FIG. 3C, the second, third, and fourth switch elements M02, M03, and M04 are turned off, and the first switch element M01 is turned on. The first data voltage VDATA1 of the pixel data is applied to the first node n1 to change the voltage of the first node n1 to the data voltage VDATA1.

Here, the voltage Vg of the first node becomes VDATA1, and the voltage Vs of the second node remains VINIT−Vth, so that the gate-source voltage Vgs of the driving element becomes VDATA−(VINIT−Vth).

Figure 3D:
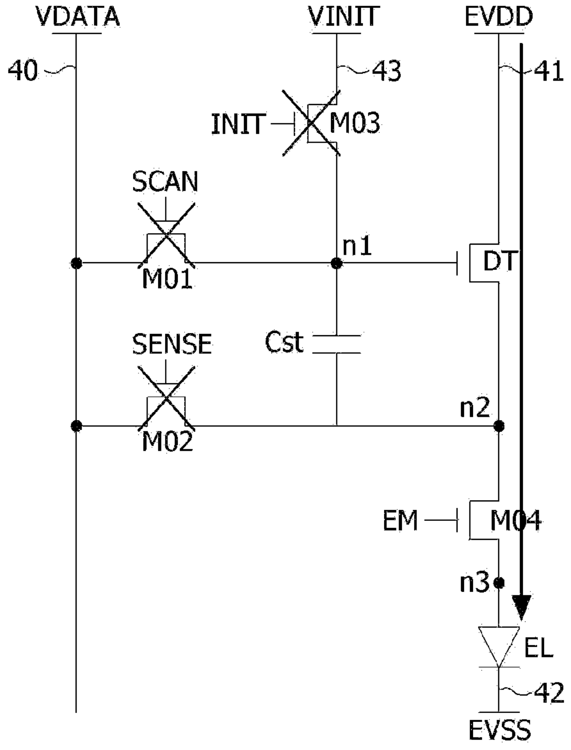
Figure 3D:
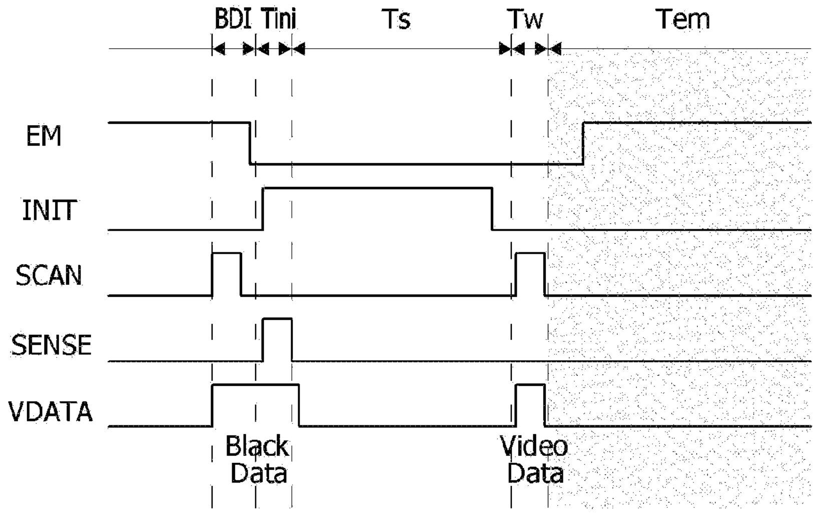

In the light-emitting operation Tem, as shown in FIG. 3D, the fourth switch element M04 is turned on, and the first, second, and third switch elements M01, M02, and M03 are turned off. In this case, a current generated according to the gate-source voltage Vgs of the driving element DT, that is, a voltage between the first and second nodes n1 and n2, is supplied to the light-emitting element EL so that the light-emitting element EL emits light.

Here, the voltage Vg of the first node remains VDATA1, and the voltage Vs of the second node remains VINIT−Vth, so that the gate-source voltage Vgs of the driving element remains VDATA1−VINIT−Vth).

The pixel circuit according to the exemplary embodiment may be implemented such that the second data voltage, which is a data voltage of a predetermined grayscale, different from the first data voltage, which is a pixel driving voltage, is applied to the source node of the driving element through a data line, instead of applying the reference voltage to the source node of the driving element through the reference voltage line.

Figure 4A:
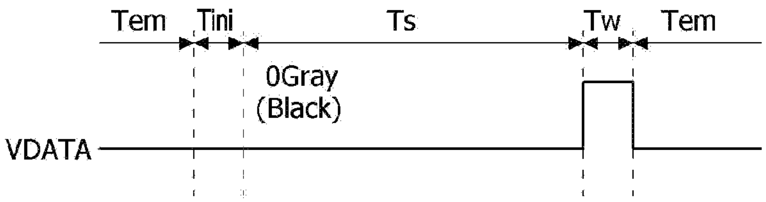
FIGS. 4A to 4C are diagrams for describing a variable range of a second data voltage according to the exemplary embodiment.
Figure 4B:
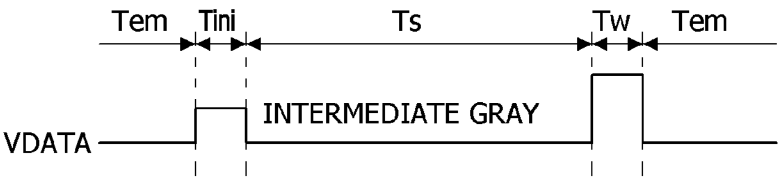
Figure 4C:
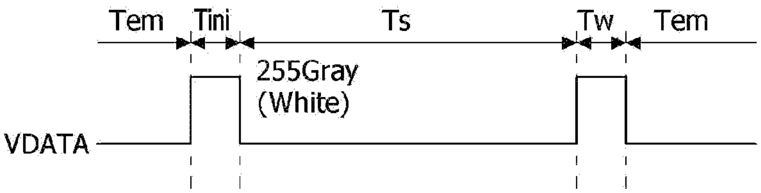

FIGS. 4A to 4C are diagrams for describing a variable range of a second data voltage according to the exemplary embodiment.

Referring to FIGS. 4A to 4C, a voltage level of the second data voltage according to the exemplary embodiment may be a preset value, and may be set to various grayscale data voltages including the low-grayscale data voltage, for example, the black data voltage.

For example, the voltage level of the second data voltage may be set to the low-grayscale data voltage, for example, the black data voltage as shown in FIG. 4A, the voltage level of the second data voltage may be set to a data voltage of an intermediate grayscale between a low grayscale and a high grayscale as shown in FIG. 4B, and the voltage level of the second data voltage may be set to a high-grayscale data voltage, for example, a white data voltage as shown in FIG. 4C.

Here, the low grayscale for setting the second data voltage may be a black grayscale having a most significant bit (MSB) of "00" and the high grayscale may be a white grayscale having an MSB of "11."

Here, since the voltage level of the second data voltage is linked with a voltage level of each of the initialization voltage VINIT and the low-potential power voltage EVSS, the voltage level of the second data voltage may be set differently according to the voltage level of each of the initialization voltage VINIT and the low-potential power voltage EVSS. For example, the voltage level of the initialization voltage VINIT and the voltage level of the low-potential power voltage EVSS may be changed according to the voltage level of the second data voltage, or the voltage level of the second data voltage may be changed according to the voltage level of the initialization voltage VINIT and the voltage level of the low-potential power voltage EVSS.

Figure 5:
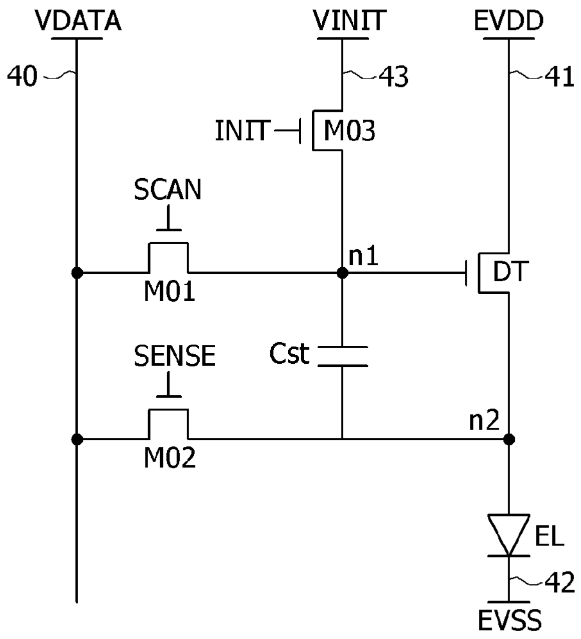
FIG. 5 is a diagram illustrating a pixel circuit according to a second exemplary embodiment of the present disclosure.
Figure 6:
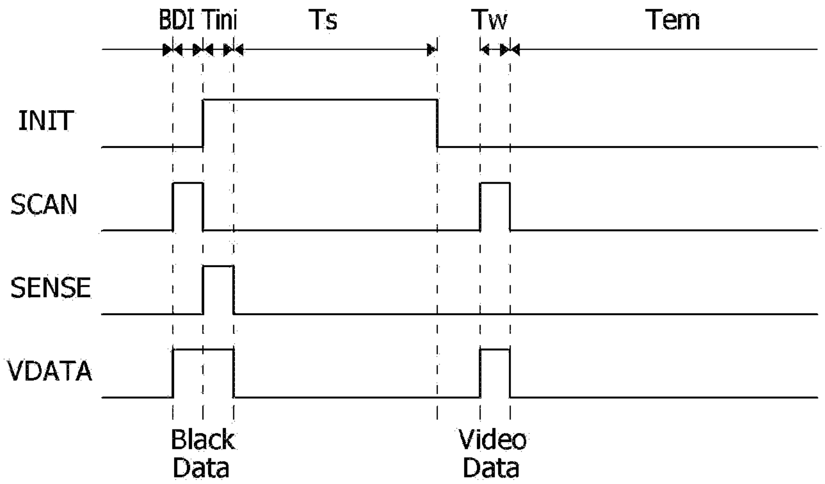
FIG. 6 is a diagram illustrating a driving timing of the pixel circuit shown in FIG. 5, according to an embodiment of the present disclosure.

FIG. 5 is a diagram illustrating a pixel circuit according to a second exemplary embodiment of the present disclosure, and FIG. 6 is a diagram illustrating a driving timing of the pixel circuit shown in FIG. 5, according to an embodiment of the present disclosure.

Referring to FIGS. 5 and 6, a pixel circuit according to a second exemplary embodiment of the present disclosure includes a light-emitting element EL, a driving element DT configured to supply a current to the light-emitting element EL, a plurality of switch elements M01, M02, and M03 configured to turn on or turn off current paths connected to the driving element DT, and a first capacitor Cst configured to store a gate-source voltage of the driving element DT. The driving element DT and the switch elements M01, M02, and M03 may be implemented as n-channel oxide TFTs, but is not limited thereto, and may alternatively be implemented as p-channel oxide TFTs. When p-channel oxide TFTs are implemented, voltage levels of respectively signals in FIG. 6 may also be changed accordingly.

The light-emitting element EL emits light by a current applied through a channel of the driving element DT according to a gate-source voltage Vgs of the driving element DT, which varies according to a data voltage VDATA and the like.

The driving element DT supplies a current to the light-emitting element EL according to the gate-source voltage Vgs thereof to drive the light-emitting element EL. The driving element DT includes a gate connected to a first node n1, a first electrode (or a drain) connected to a first power line 41, and a second electrode (or source) connected to a second node n2.

A first switch element M01 is turned on according to a gate-on voltage of a scan signal SCAN and connects a data voltage line 40 to the first node n1 to apply the first data voltage VDATA1. The first switch element M01 includes a gate connected to a gate line through which the scan signal SCAN is applied, a first electrode connected to a data voltage line 40 through which a first data voltage VDATA1 is applied, and a second electrode connected to the first node n1.

A second switch element M02 is turned on according to a gate-on voltage of a sensing signal SENSE and connects the data voltage line 40 to the second node n2 to apply a second data voltage VDATA2. The second switch element M02 includes a gate connected to a gate line through which the sensing signal SENSE is applied, a first electrode connected to the data voltage line 40 through which the second data voltage VDATA2 is applied, and a second electrode connected to the second node n2.

A third switch element M03 is turned on according to a gate-on voltage of an initialization signal INIT and connects an initialization voltage line 43 to the first node n1 to apply an initialization voltage VINIT. The third switch element M03 includes a gate to which the initialization signal INIT is applied, a first electrode connected to the initialization voltage line 43, and a second electrode connected to the first node n1.

As shown in FIG. 6, the pixel circuit according to the second exemplary embodiment may be driven in the order of an initialization operation Tini, a sensing operation Ts, a data writing operation Tw, and a light-emitting operation Tem. First, in the initialization operation Tini, the pixel circuit is initialized to have the second data voltage VDATA2 of a predetermined grayscale through a data line. In the sensing operation Ts, a threshold voltage Vth of the driving element DT is sensed and stored in the first capacitor Cst. In the data writing operation Tw, a first data voltage VDATA of pixel data is applied to the first node n1. In the light-emitting operation Tem, the light-emitting element EL may emit light with a luminance corresponding to a grayscale value of the pixel data. In the initialization operation Tini, the sensing operation Ts, the data writing operation Tw, and the light-emitting operation Tem, the driving element DT, the switching elements M01, M02, M03, the first capacitor Cst and light-emitting element EL have the same or similar operations as in the first exemplary embodiment, and will not be described in detail.

Figure 7:
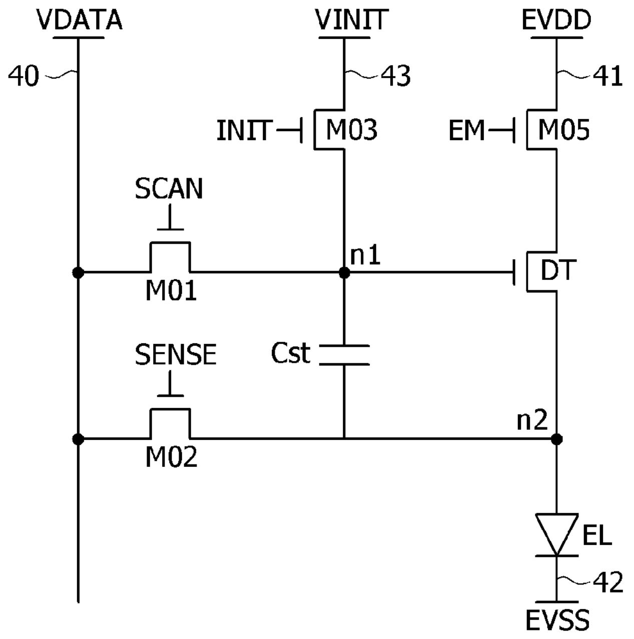
FIG. 7 is a diagram illustrating a pixel circuit according to a third exemplary embodiment of the present disclosure.
Figure 8:
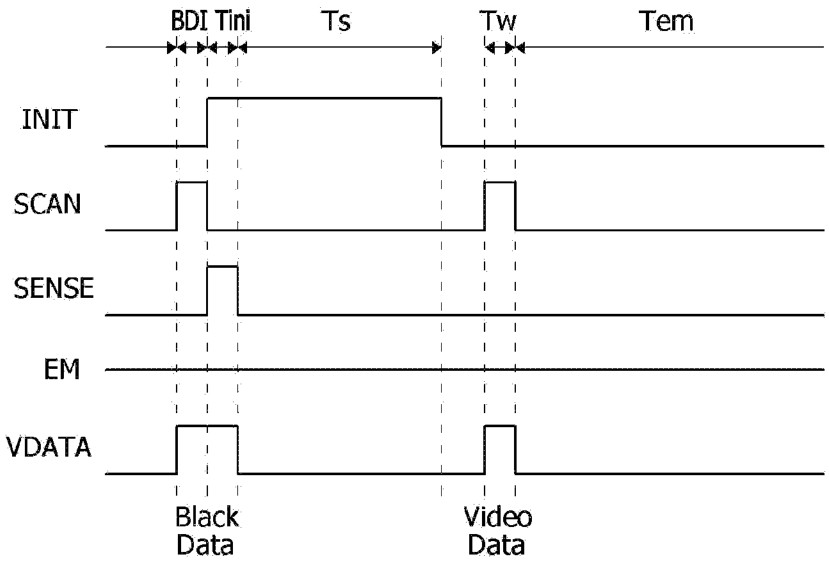
FIG. 8 is a diagram illustrating a driving timing of the pixel circuit shown in FIG. 7, according to an embodiment of the present disclosure.

FIG. 7 is a diagram illustrating a pixel circuit according to a third exemplary embodiment of the present disclosure, and FIG. 8 is a diagram illustrating a driving timing of the pixel circuit shown in FIG. 7, according to an embodiment of the present disclosure.

Referring to FIGS. 7 and 8, a pixel circuit according to a third exemplary embodiment of the present disclosure includes a light-emitting element EL, a driving element DT configured to supply a current to the light-emitting element EL, a plurality of switch elements M01, M02, M03, and M05 configured to turn on or turn off current paths connected to the driving element DT, and a first capacitor Cst configured to store a gate-source voltage of the driving element DT. The driving element DT and the switch elements M01, M02, M03, and M05 may be implemented as n-channel oxide TFTs, but is not limited thereto, and may alternatively be implemented as p-channel oxide TFTs. When p-channel oxide TFTs are implemented, voltage levels of respectively signals in FIG. 8 may also be changed accordingly.

The light-emitting element EL emits light by a current applied through a channel of the driving element DT according to a gate-source voltage Vgs of the driving element DT, which varies according to a data voltage VDATA and the like.

The driving element DT supplies a current to the light-emitting element EL according to the gate-source voltage Vgs thereof to drive the light-emitting element EL. The driving element DT includes a gate connected to a first node n1, a first electrode (or a drain) connected to a second electrode of a fifth switch element M05, and a second electrode (or source) connected to a second node n2.

A first switch element M01 is turned on according to a gate-on voltage of a scan signal SCAN and connects a data voltage line 40 to the first node n1 to apply the first data voltage VDATA1. The first switch element M01 includes a gate connected to a gate line through which the scan signal SCAN is applied, a first electrode connected to a data voltage line 40 through which a first data voltage VDATA1 is applied, and a second electrode connected to the first node n1.

A second switch element M02 is turned on according to a gate-on voltage of a sensing signal SENSE and connects the data voltage line 40 to the second node n2 to apply a second data voltage VDATA2. The second switch element M02 includes a gate connected to a gate line through which the sensing signal SENSE is applied, a first electrode connected to the data voltage line 40 through which the second data voltage VDATA2 is applied, and a second electrode connected to the second node n2.

A third switch element M03 is turned on according to a gate-on voltage of an initialization signal INIT and connects an initialization voltage line 43 to the first node n1 to apply an initialization voltage VINIT. The third switch element M03 includes a gate to which the initialization signal INIT is applied, a first electrode connected to the initialization voltage line 43, and a second electrode connected to the first node n1.

A fifth switch element M05 is turned on according to a gate-on voltage of an EM signal EM and connects the first power line 41 to the driving element DT to apply a pixel driving voltage EVDD. The fifth switch element M05 includes a gate to which the EM signal EM is applied, a first electrode connected to the first power line 41, and a second electrode connected to the first electrode of the driving element DT.

As shown in FIG. 8, the pixel circuit according to the third exemplary embodiment may be driven in the order of an initialization operation Tini, a sensing operation Ts, a data writing operation Tw, and a light-emitting operation Tem. First, in the initialization operation Tini, the pixel circuit is initialized to have the second data voltage VDATA2 of a predetermined grayscale through a data line. In the sensing operation Ts, a threshold voltage Vth of the driving element DT is sensed and stored in the first capacitor Cst. In the data writing operation Tw, a first data voltage VDATA of pixel data is applied to the first node n1. In the light-emitting operation Tem, the light-emitting element EL may emit light with a luminance corresponding to a grayscale value of the pixel data. In the initialization operation Tini, the sensing operation Ts, the data writing operation Tw, and the light-emitting operation Tem, the driving element DT, the switching elements M01, M02, M03, the first capacitor Cst and light-emitting element EL have the same or similar operations as in the first exemplary embodiment, and will not be described in detail.

Figure 9:
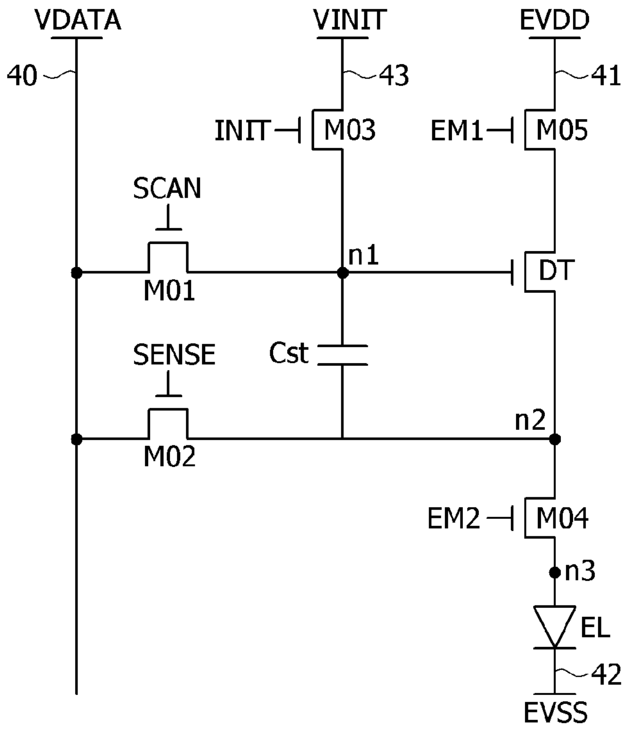
FIG. 9 is a diagram illustrating a pixel circuit according to a fourth exemplary embodiment of the present disclosure.
Figure 10:
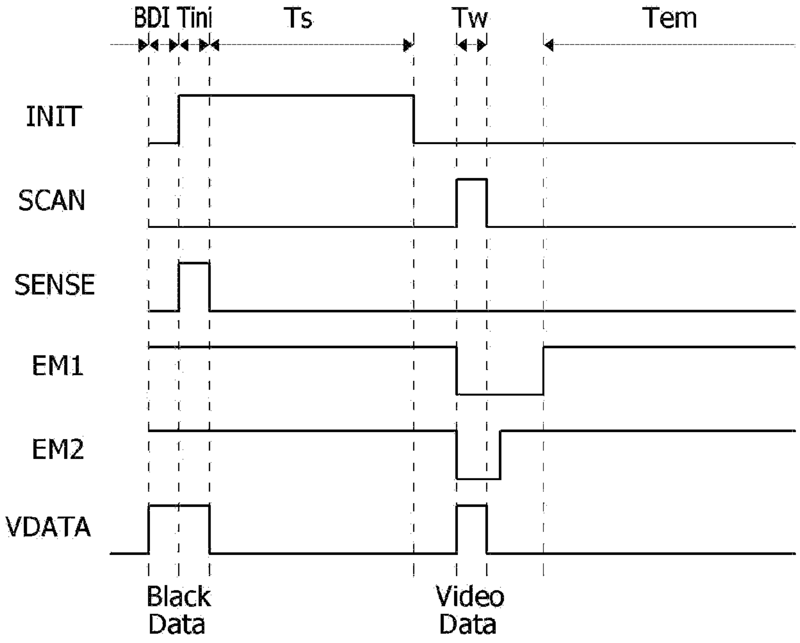
FIG. 10 is a diagram illustrating a driving timing of the pixel circuit shown in FIG. 9, according to an embodiment of the present disclosure.

FIG. 9 is a diagram illustrating a pixel circuit according to a fourth exemplary embodiment of the present disclosure, and FIG. 10 is a diagram illustrating a driving timing of the pixel circuit shown in FIG. 9, according to an embodiment of the present disclosure.

Referring to FIGS. 9 and 10, a pixel circuit according to a fourth exemplary embodiment of the present disclosure includes a light-emitting element EL, a driving element DT configured to supply a current to the light-emitting element EL, a plurality of switch elements M01, M02, M03, M04, and M05 configured to turn on or turn off current paths connected to the driving element DT, and a first capacitor Cst configured to store a gate-source voltage of the driving element DT. The driving element DT and the switch elements M01, M02, M03, M04, and M05 may be implemented as n-channel oxide TFTs, but is not limited thereto, and may alternatively be implemented as p-channel oxide TFTs. When p-channel oxide TFTs are implemented, voltage levels of respectively signals in FIG. 10 may also be changed accordingly.

The light-emitting element EL emits light by a current applied through a channel of the driving element DT according to a gate-source voltage Vgs of the driving element DT, which varies according to a data voltage VDATA and the like.

The driving element DT supplies a current to the light-emitting element EL according to the gate-source voltage Vgs thereof to drive the light-emitting element EL. The driving element DT includes a gate connected to a first node n1, a first electrode (or a drain) connected to a second electrode of a fifth switch element M05, and a second electrode (or source) connected to a second node n2.

A first switch element M01 is turned on according to a gate-on voltage of a scan signal SCAN and connects a data voltage line 40 to the first node n1 to apply the first data voltage VDATA1. The first switch element M01 includes a gate connected to a gate line through which the scan signal SCAN is applied, a first electrode connected to a data voltage line 40 through which a first data voltage VDATA1 is applied, and a second electrode connected to the first node n1.

A second switch element M02 is turned on according to a gate-on voltage of a sensing signal SENSE and connects the data voltage line 40 to the second node n2 to apply a second data voltage VDATA2. The second switch element M02 includes a gate connected to a gate line through which the sensing signal SENSE is applied, a first electrode connected to the data voltage line 40 through which the second data voltage VDATA2 is applied, and a second electrode connected to the second node n2.

A third switch element M03 is turned on according to a gate-on voltage of an initialization signal INIT and connects an initialization voltage line 43 to the first node n1 to apply an initialization voltage VINIT. The third switch element M03 includes a gate to which the initialization signal INIT is applied, a first electrode connected to the initialization voltage line 43, and a second electrode connected to the first node n1.

A fourth switch element M04 is turned on according to a gate-on voltage of a second EM signal EM2 and connects the second electrode of the driving element DT to an anode of the light-emitting element EL. The fourth switch element M04 includes a gate connected to a gate line through which the EM signal EM2 is applied, a first electrode connected to the second node n2, and a second electrode connected to the third node n3.

A fifth switch element M05 is turned on according to a gate-on voltage of a first EM signal EM1 and connects the first power line 41 to the driving element DT to apply a pixel driving voltage EVDD. The fifth switch element M05 includes a gate to which the first EM signal EM1 is applied, a first electrode connected to the first power line 41, and a second electrode connected to the first electrode of the driving element DT.

As shown in FIG. 10, the pixel circuit according to the fourth exemplary embodiment may be driven in the order of an initialization operation Tini, a sensing operation Ts, a data writing operation Tw, and a light-emitting operation Tem. First, in the initialization operation Tini, the pixel circuit is initialized to have the second data voltage VDATA2 of a predetermined grayscale through a data line. In the sensing operation Ts, a threshold voltage Vth of the driving element DT is sensed and stored in the first capacitor Cst. In the data writing operation Tw, a first data voltage VDATA of pixel data is applied to the first node n1. In the light-emitting operation Tem, the light-emitting element EL may emit light with a luminance corresponding to a grayscale value of the pixel data. In the initialization operation Tini, the sensing operation Ts, the data writing operation Tw, and the light-emitting operation Tem, the driving element DT, the switching elements M01, M02, M03, the first capacitor Cst and light-emitting element EL have the same or similar operations as in the first exemplary embodiment, and will not be described in detail.

Figure 11:
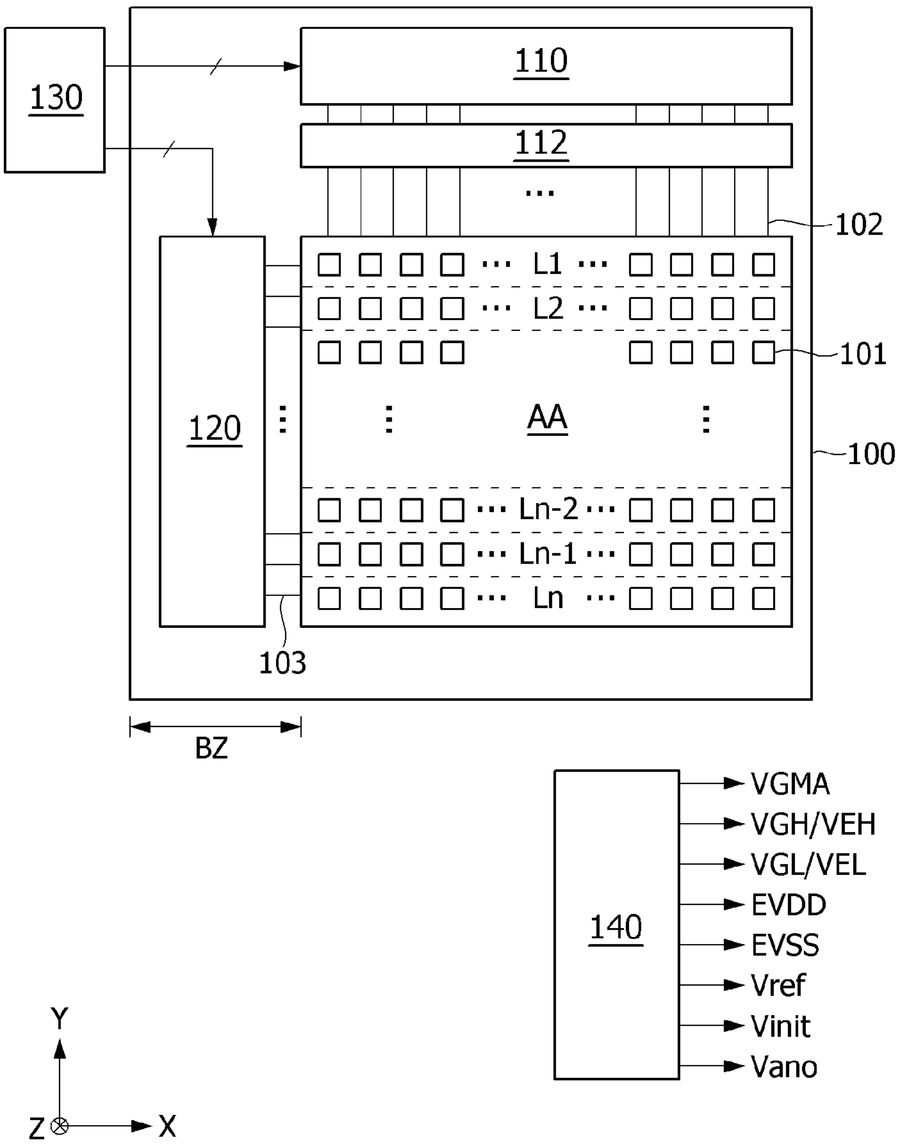
FIG. 11 is a block diagram illustrating a display device according to an exemplary embodiment of the present disclosure.
Figure 12:
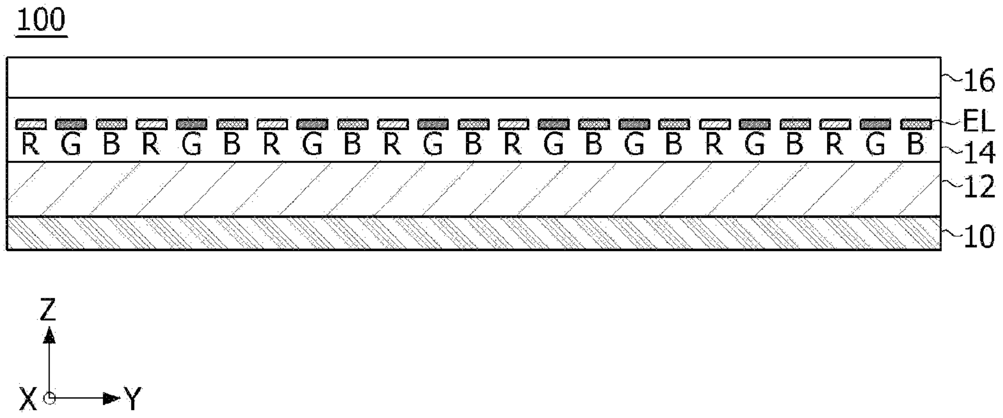
FIG. 12 is a diagram illustrating a cross-sectional structure of a display panel of the display device shown in FIG. 11, according to an embodiment of the present disclosure.

FIG. 11 is a block diagram illustrating a display device according to an exemplary embodiment of the present disclosure, and FIG. 12 is a diagram illustrating a cross-sectional structure of a display panel of the display device shown in FIG. 11, according to an embodiment of the present disclosure.

Referring to FIG. 11, a display device according to an exemplary embodiment of the present disclosure may include a display panel 100, a display panel driving circuit for writing pixel data to pixels of the display panel 100, and a power supply unit 140 that generates power required for driving the pixels and the display panel driving circuit and other components not shown.

The display panel 100 may include a pixel array AA that displays an input image. The pixel array AA may include a plurality of data lines 102, a plurality of gate lines 103 crossing the data lines 102, and pixels disposed in a matrix form. The pixel array may be an active region which displays input image data.

The pixel array AA may include a plurality of pixel lines L1 to Ln. Each of the pixel lines L1 to Ln may include one line of pixels disposed in a line direction X in the pixel array AA of the display panel 100. Pixels disposed in one pixel line may share the gate lines 103. Pixels disposed in a column direction Y along a data line direction may share the same data line 102. One horizontal period 1H is a time obtained by dividing one frame period by the total number of the pixel lines L1 to Ln.

Touch sensors may be disposed on the display panel 100. A touch input may be sensed using separate touch sensors or through the pixels. The touch sensors may be disposed on a screen of the display panel in an on-cell type or an add-on type, or may be implemented with in-cell type touch sensors embedded in the pixel array AA.

The display panel 100 may be implemented as a flexible display panel. The flexible display panel may be manufactured as a plastic OLED panel, but is not limited thereto, and may be formed with polymer, cloth, fiber, rubber, paper, leather, etc. An organic thin film may be disposed on a back plate of the plastic OLED panel, and the pixel array AA may be formed on the organic thin film.

The back plate of the plastic OLED may be a polyethylene terephthalate PET substrate, but is not limited thereto, and may include any material including polyethyleneterephthalate (PET), polyimide (PI), acrylonitrile-butadiene-styrene copolymer (ABS), polymethyl methacrylate (PMMA), polyethylene naphthalate (PEN), polycarbonate (PC), polyethersulfone (PES), polyarylate (PAR), polysulfone (PSF), ciclic-olefin copolymer, cyclic olefin copolymer (COC), triacetylcellulose (TAC), polyvinyl alcohol (PVA), polystyrene (PS), polycarbonate (PC), polyethersulfone (PES), polynorborneene (PNB) and the like. The organic thin film is formed on the back plate. The pixel array AA and a touch sensor array may be formed on the organic thin film. The back plate blocks moisture permeation so that the pixel array AA is not exposed to moisture. The organic thin film may be a thin polyimide (PI) film substrate. A multi-layered buffer film may be formed of an insulating material (not shown) on the organic thin film. Wirings for supplying power or signals applied to the pixel array AA and the touch sensor array may be formed on the organic thin film.

Each of the pixels may be divided into a red sub-pixel (hereinafter referred to as "R sub-pixel"), a green sub-pixel (hereinafter referred to as "G sub-pixel"), and a blue sub-pixel (hereinafter referred to as "B sub-pixel"). Each of the pixels may further include a white sub-pixel. Each of sub-pixels 101 includes a pixel circuit. The pixel circuit is connected to the data line 102 and the gate line 103 and other lines such as power lines.

Hereinafter, a pixel may be interpreted as having the same meaning as a sub-pixel.

As shown in FIG. 12, the display panel 100 may include a circuit layer 12, a light-emitting element layer 14, and an encapsulation layer 16 stacked on a substrate 10 when viewed from a cross-sectional structure. FIG. 12 is merely a simplified illustration of a cross-sectional structure of the display panel for convenience of writing. Actual display panel may include other layers not shown, and position of each layer is not limited to that set forth herein.

The circuit layer 12 may include a pixel circuit connected to wirings such as a data line, a gate line, and a power line, a gate driving unit GIP connected to the gate lines, a demultiplexer array 112, a circuit for auto probe inspection omitted from the drawing, and the like. The wiring and circuit elements of the circuit layer 12 may include a plurality of insulating layers, two or more metal layers separated from each other with the insulating layer therebetween, and an active layer including a semiconductor material. All transistors formed in the circuit layer 12 may be implemented with an oxide TFT including an n-channel type oxide semiconductor, but is not limited thereto. Transistors in the circuit layer 12 may also be implemented with p-channel type oxide semiconductor.

The light-emitting element layer 14 may include a light-emitting element EL driven by the pixel circuit. The light-emitting element EL may include a red (R) light-emitting element, a green (G) light-emitting element, and a blue (B) light-emitting element, but is not limited thereto. The light-emitting element layer 14 may also include a white light-emitting element. Alternatively, the light-emitting element layer 14 may include a white light-emitting element and a color filter. The light-emitting elements EL of the light-emitting element layer 14 may be covered by a protective layer including an organic film and a protective film for example.

The encapsulation layer 16 covers the light-emitting element layer 14 so as to seal the circuit layer 12 and the light-emitting element layer 14. The encapsulation layer 16 may have a multi-insulating film structure in which an organic film and an inorganic film are alternately stacked. The inorganic film may block the penetration of foreign matters such as moisture or oxygen. The organic film flattens a surface of the inorganic film. When the organic film and the inorganic film are stacked in multiple layers, a moving path of foreign matters such as moisture or oxygen becomes longer compared to that of a single layer, and thus, the penetration of foreign matters such as moisture and oxygen affecting the light-emitting element layer 14 may be effectively blocked.

A touch sensor layer formed on the encapsulation layer 16 may be disposed. The touch sensor layer may include capacitive touch sensors that sense a touch input based on a change in capacitance before and after the touch input. The touch sensor layer may include metal wiring patterns and insulating films that form the capacitance of the touch sensors. The insulating films may insulate intersecting portions in the metal wiring patterns and may planarize the surface of the touch sensor layer. The capacitance of the touch sensor may be formed between the metal wiring patterns. A polarizing plate may be disposed on the touch sensor layer. The polarizing plate may improve the visibility and contrast ratio by converting the polarization of external light reflected by the metal of the touch sensor layer and the circuit layer 12. The polarizing plate may be implemented as a polarizing plate in which a linear polarizing plate and a phase retardation film are bonded, or a circular polarizing plate. A cover glass may be adhered to the polarizing plate.

The display panel 100 may further include a touch sensor layer and a color filter layer stacked on the encapsulation layer 16. The color filter layer may include red, green, and blue color filters, and a black matrix pattern. The color filter layer may absorb a part of the wavelength of light reflected from the circuit layer and the touch sensor layer to replace the role of the polarizing plate, and may increase color purity of an image reproduced in the pixel array AA. This embodiment can improve the light transmittance of the display panel 100 and enhance and flexibility and decrease the thickness of the display panel 100 by applying a color filter layer 20 having a higher light transmittance than the polarizing plate to the display panel. A cover glass may be adhered onto the color filter layer.

The power supply unit 140 may generate direct current (DC) power required for driving the pixel array AA of the display panel 100 and the display panel driving circuit by using a DC-DC converter. The DC-DC converter may include a charge pump, a regulator, a buck converter, a boost converter, and the like. The power supply unit 140 may adjust a DC input voltage applied from a host system (not shown), and generate DC voltages such as a gamma reference voltage VGMA, gate-on voltages VGH and VEH, gate-off voltages VGL and VEL, a pixel driving voltage EVDD, a low-potential power voltage EVSS, and the like. The gamma reference voltage VGMA is supplied to a data driving unit 110. The gate-on voltages VGH and VEH and the gate-off voltages VGL and VEL are supplied to a gate driving unit 120. The pixel driving voltage EVDD and the low-potential power voltage EVSS are commonly supplied to the pixels.

The display panel driving circuit writes pixel data (digital data) of an input image to the pixels of the display panel 100 under the control of a timing controller (TCON) 130.

The display panel driving circuit may include the data driving unit 110 and the gate driving unit 120, but is not limited thereto, and may include other driving units such as a touch driving unit.

The demultiplexer (DEMUX) array 112 may be disposed between the data driving unit 110 and the data lines 102. The demultiplexers may include a plurality of switch elements disposed on the display panel 100. The demultiplexer array 112 may reduce the number of channels of the data driving unit 110 by sequentially connecting one channel of the data driving unit 110 to the plurality of data lines 102 and time-divisionally distributing the data voltage output through one channel of the data driving unit 110 to the data lines 102. The demultiplexer array 112 may be omitted. In this case, output buffers AMP of the data driving unit 110 are directly connected to the data lines 102.

The display panel driving circuit may further include a touch sensor driving unit for driving the touch sensors. The touch sensor driving unit is omitted from FIG. 11. In a mobile device, the timing controller 130, the power supply unit 140, the data driving unit 110, and the like may be integrated into one drive integrated circuit (IC).

The data driving unit 110 may convert the pixel data of the input image, which is received from the timing controller 130 for each frame period, into a gamma compensation voltage by using a digital to analog converter (DAC), and generates a data voltage (e.g., VDATA). The gamma reference voltage VGMA is divided into a gamma compensation voltage for each grayscale through a voltage divider circuit. The gamma compensation voltage divided from the gamma reference voltage VGMA is provided to the DAC of the data driving unit 110. The data voltage is output through an output buffer AMP in each of the channels of the data driving unit 110.

In the data driving unit 110, the output buffer AMP included in one channel may be connected to neighboring data lines 102 through the demultiplexer array 112. The demultiplexer array 112 may be directly formed on the substrate of the display panel 100 or may be integrated into one drive IC together with the data driving unit 110.

The gate driving unit 120 may be implemented as a gate in panel (GIP) circuit formed directly on a bezel region BZ on the display panel 100 together with a TFT array of the pixel array AA. Alternatively, the gate driving unit 120 may be connected to the display panel 100 by a tape automatic bonding (TAB) method, connected to a bonding pad of the display panel 100 by a COG or COP method, connected to the display panel 100 by a COF method. The gate driving unit 120 sequentially outputs gate signals to the gate lines 103 under the control of the timing controller 130. The gate driving unit 120 may sequentially supply the gate signals to the gate lines 103 by shifting the gate signals by using a shift register.

The gate signal may include a scan signal for selecting pixels of a line in which data is to be written in synchronization with the data voltage and an EM signal defining a light-emitting time of pixels charged with the data voltage, but is not limited thereto. For example, the gate signal may also include a sense signal for turning on or off a sensing transistor.

The gate driving unit 120 may include a scan driving unit 121, an EM driving unit 122, and an initialization driving unit 123.

The scan driving unit 121 outputs a scan signal (e.g., SCAN in FIG. 1) in response to a start pulse and a shift clock output from the timing controller 130, and shifts the scan signal SCAN in sync with a shift clock timing. The EM driving unit 122 outputs an EM signal (e.g., EM in FIG. 1, EM1 and EM2 in FIG. 9) in response to the start pulse and the shift clock output from the timing controller 130, and sequentially shifts the EM signal according to the shift clock. The initialization driving unit 123 outputs an initialization signal (e.g., INIT in FIG. 1) in response to a start pulse and a shift clock output from the timing controller 130, and shifts the initialization signal INIT in sync with the shift clock timing. Accordingly, the scan signal SCAN, the EM signal EM, and the initialization signal INIT are sequentially supplied to the gate lines 103 of the pixel lines L1 to Ln. In the case of bezel-less models, at least some of the transistors constituting the gate driving unit 120 and clock wirings may be distributed and disposed in the pixel array AA.

The timing controller 130 receives digital video data DATA of an input image and a timing signal synchronized with the digital video data DATA from a host system (not shown). The timing signal may include a vertical synchronization signal Vsync, a horizontal synchronization signal Hsync, a main clock CLK, a data enable signal DE, and the like. The vertical synchronization signal Vsync and the horizontal synchronization signal Hsync may be omitted since a vertical period and a horizontal period may be obtained by a method of counting the data enable signal DE. The data enable signal DE has a period of one horizontal period 1H.

The host system may be any system requiring a display device including but not limited to a television system, a set-top box, a navigation system, a personal computer (PC), a home theater system, a vehicle system, and a system of a mobile device.

The timing controller 130 may multiply an input frame frequency by i and control an operation timing of the display panel driving circuit with a frame frequency of the input frame frequency x i Hz (here "i" is a positive integer greater than 0). The input frame frequency is 60 Hz in the National Television Standards Committee (NTSC) scheme and 50 Hz in the Phase-Alternating Line (PAL) scheme. In order to lower a refresh rate of the pixels P in the low-speed driving mode, the timing controller 130 may lower the frame frequency into a frequency ranging from 1 Hz to 30 Hz.

The timing controller 130 may generate a data timing control signal for controlling the operation timing of the data driving unit 110, MUX signals for controlling the operation timing of the demultiplexer array 112, and a gate timing control signal for controlling the operation timing of the gate driving unit 120 and other timing control signals for controlling other operations of other components on the basis of the timing signals Vsync, Hsync, and DE and the like received from the host system.

A voltage level of the gate timing control signal output from the timing controller 130 may be converted into the gate-high voltages VGH and VEH and the gate-low voltages VGL and VEL through a level shifter (not shown) and supplied to the gate driving unit 120. That is, the level shifter converts a low-level voltage of the gate timing control signal into gate-low voltages VGL and VEL and converts a high-level voltage of the gate timing control signal into gate-on voltages VGH and VEH. The transistor may be turned on in response to the gate-on voltage and turned off in response to the gate-off voltage. In the case of an n-channel transistor, the gate-on voltage may be a gate-high voltage VGH, and the gate-off voltage may be a gate-low voltage VGL. In the case of a p-channel transistor, the gate-on voltage may be a gate-low voltage VGL, and the gate-off voltage may be a gate-high voltage VGH. The gate timing control signal includes the start pulse and the shift clock, a reset signal, an initialization signal, and the like.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A pixel circuit comprising:

a driving element including a first electrode connected to a power line that supplies a pixel driving voltage to the driving element, a gate electrode connected to a first node, and a second electrode connected to a second node;

a first switch element connected between a data line and the first node;

a second switch element connected between the data line and the second node;

a light-emitting element including an anode connected to the second node and a cathode to which a low-potential power voltage is applied; and a capacitor connected between the first node and the second node, wherein a voltage level of a second data voltage is set to a value between a predetermined low-grayscale data voltage and a predetermined high-grayscale data voltage, and is set to a different value depending on a voltage level of an initialization voltage and a voltage level of the low-potential power voltage.

2. The pixel circuit of claim 1, wherein the pixel circuit is driven in an order of an initialization period, a sensing period, a data writing period, and a light-emitting period, wherein during the initialization period, the first switch element is turned off, and the second switch element supplies the second data voltage from the data line to the second node in response to a second gate signal, and during the data writing period, the second switch element is turned off, and the first switch element supplies a first data voltage from the data line to the first node in response to a first gate signal.

3. The pixel circuit of claim 2, wherein the first switch element includes a first electrode of the first switch element that is connected to the data line, a gate electrode of the first switch element to which the first gate signal is applied, and a second electrode of the first switch element that is connected to the first node, and the second switch element includes a first electrode of the second switch element that is connected to the data line, a gate electrode of the second switch element to which the second gate signal is applied, and a second electrode of the second switch element that is connected to the first node.

4. The pixel circuit of claim 2, further comprising:

a third switch element including a first electrode of the third switch element to which an initialization voltage is applied, a gate electrode of the third switch element to which a third gate signal is applied, and a second electrode of the third switch element that is connected to the first node.

5. The pixel circuit of claim 4, further comprising:

a fourth switch element including a first electrode of the fourth switch element that is connected to the second node, a gate electrode of the fourth switch element to which a fourth gate signal is applied, and a second electrode of the fourth switch element that is connected to the anode.

6. The pixel circuit of claim 5, further comprising:

a fifth switch element including a first electrode connected to the power line, a gate electrode to which a fifth gate signal is applied, and a second electrode connected to the first electrode of the driving element.

7. The pixel circuit of claim 4, wherein the initialization voltage is smaller than the second data voltage.

8. The pixel circuit of claim 2, wherein the first data voltage is different from the second data voltage.

9. A display device comprising:

a display panel comprising a plurality of data lines, a plurality of gate lines crossing the plurality of data lines, a plurality of power lines, and a plurality of pixel circuits;

a data driving circuit configured to supply a data voltage to the plurality of data lines; and a gate driving circuit configured to apply a gate signal to the plurality of gate lines, wherein each of the plurality of pixel circuits includes:

a driving element including a first electrode connected to a power line of the plurality of power lines that supplies a pixel driving voltage to the driving element, a gate electrode connected to a first node, and a second electrode connected to a second node;

a first switch element connected between one data line of the plurality of data lines and the first node;

a second switch element connected between the one data line and the second node;

a light-emitting element including an anode connected to the second node and a cathode to which a low-potential power voltage is applied; and a capacitor connected between the first node and the second node, wherein a voltage level of a second data voltage is set to a value between a predetermined low-grayscale data voltage and a predetermined high-grayscale data voltage, and is set to a different value depending on a voltage level of an initialization voltage and a voltage level of the low-potential power voltage.

10. The display device of claim 9, wherein each of the plurality of pixel circuits is driven in an order of an initialization period, a sensing period, a data writing period, and a light-emitting period, wherein during the initialization period, the first switch element is turned off, and the second switch element supplies a second data voltage from the one data line to the second node in response to a second gate signal, and during the data writing period, the second switch element is turned off, and the first switch element supplies a first data voltage from the one data line to the first node in response to a first gate signal.

11. The display device of claim 10, wherein the first switch element includes a first electrode of the first switch element that is connected to the data line, a gate electrode of the first switch element to which the first gate signal is applied, and a second electrode of the first switch element that is connected to the first node, and the second switch element includes a first electrode of the second switch element that is connected to the data line, a gate electrode of the second switch element to which the second gate signal is applied, and a second electrode of the second switch element that is connected to the first node.

12. The display device of claim 9, further comprising:

a third switch element including a first electrode of the third switch element to which an initialization voltage is applied, a gate electrode of the third switch element to which a third gate signal is applied, and a second electrode of the third switch element that is connected to the first node.

13. The display device of claim 12, further comprising:

a fourth switch element including a first electrode of the fourth switch element that is connected to the second node, a gate electrode of the fourth switch element to which a fourth gate signal is applied, and a second electrode of the fourth switch element that is connected to the anode.

14. The display device of claim 13, further comprising a fifth switch element including a first electrode connected to the power line, a gate electrode to which a fifth gate signal is applied, and a second electrode connected to the first electrode of the driving element.

* * * * *